United States Patent [19]
Delatorre

[11] Patent Number: 5,388,462
[45] Date of Patent: Feb. 14, 1995

[54] CAPACITANCE PRESSURE TRANSDUCER

[75] Inventor: Leroy C. Delatorre, Sugar Land, Tex.

[73] Assignee: Panex Corporation, Sugar Land, Tex.

[21] Appl. No.: 938,201

[22] Filed: Sep. 24, 1992

[51] Int. Cl.⁶ .......................... G01L 7/06; G01L 9/12
[52] U.S. Cl. .................................... 73/718; 73/724; 73/729.1; 361/283.3; 361/283.4
[58] Field of Search ............... 73/718, 724, 729.1; 361/283.3, 283.4, 283.1

[56] References Cited

U.S. PATENT DOCUMENTS 5,168,419 12/1992 Delatorre ........................... 73/733
5,207,767 5/1993 Delatorre ........................... 73/733
5,230,250 7/1993 Delatorre ........................... 73/733

Primary Examiner—Donald Woodiel
Attorney, Agent, or Firm—Donald H. Fidler

[57] ABSTRACT

A low pressure capacitance measurement device where capacitance base members are constructed from metal and one of the base members arranged to be torqued relative to the other base member where the stress level is maintained within the elastic limits of the metal and the torque force is developed by a bellows which acts on a moment arm to torque the base member about its torque displacement axis.

29 Claims, 5 Drawing Sheets

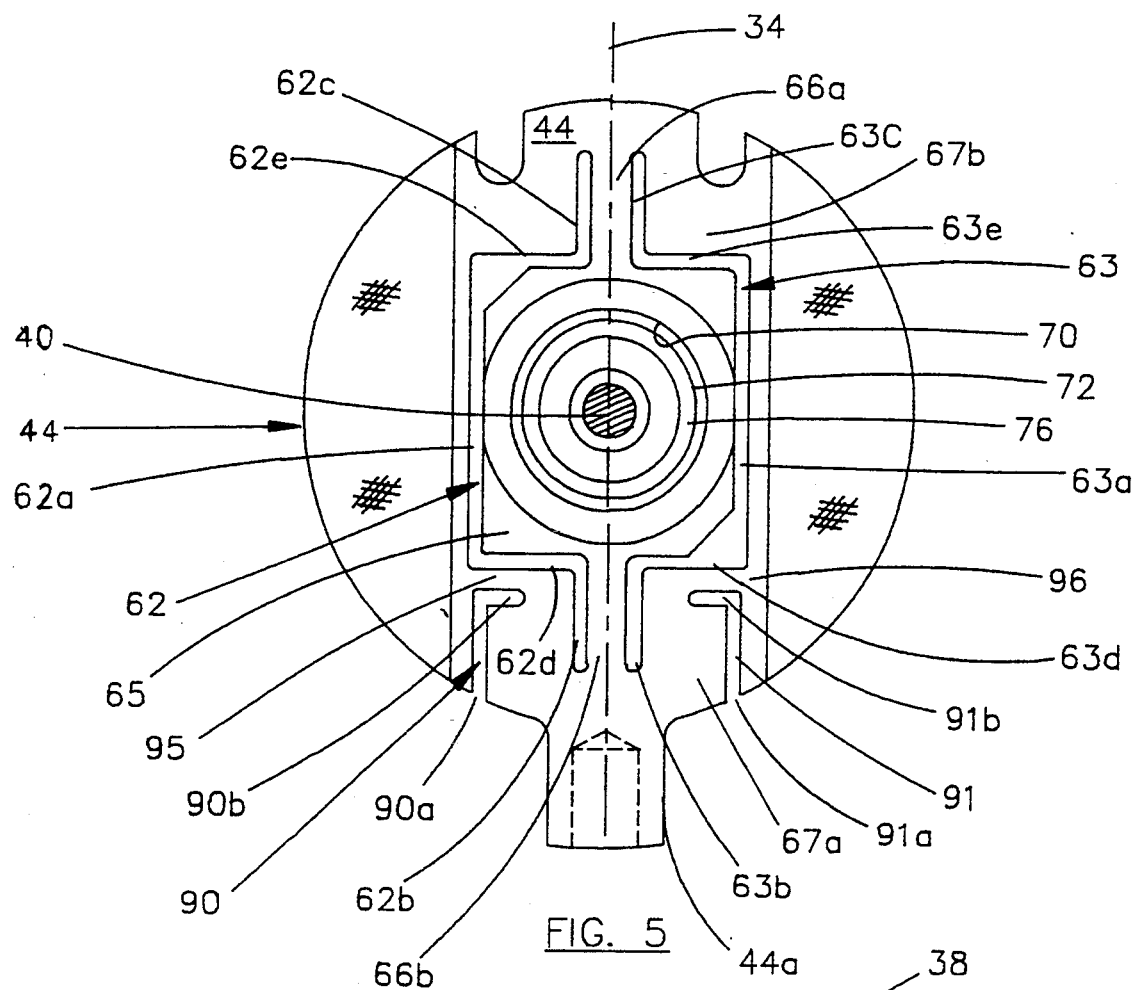
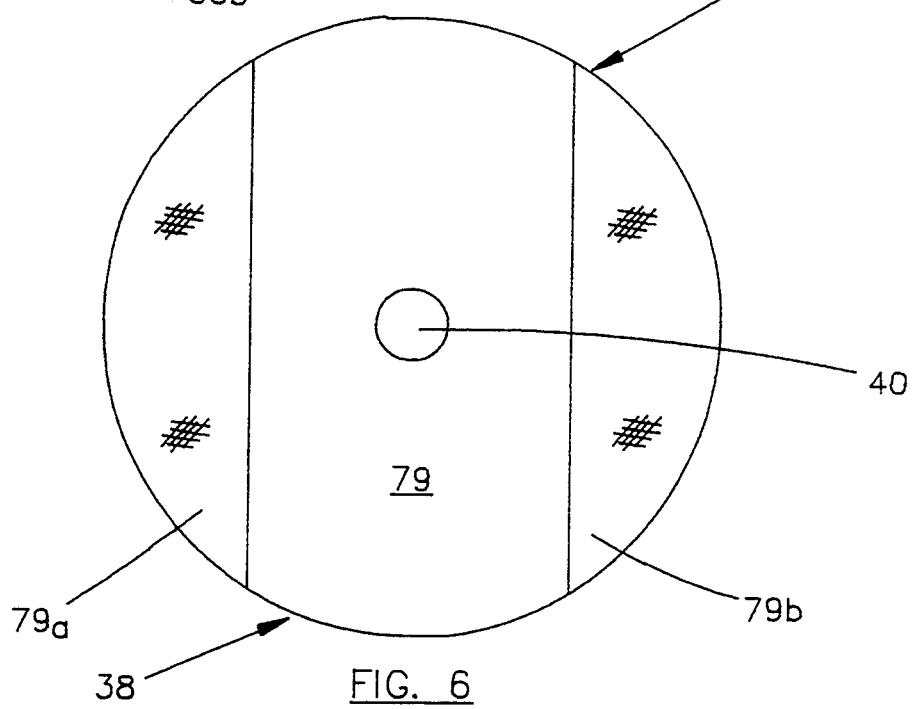

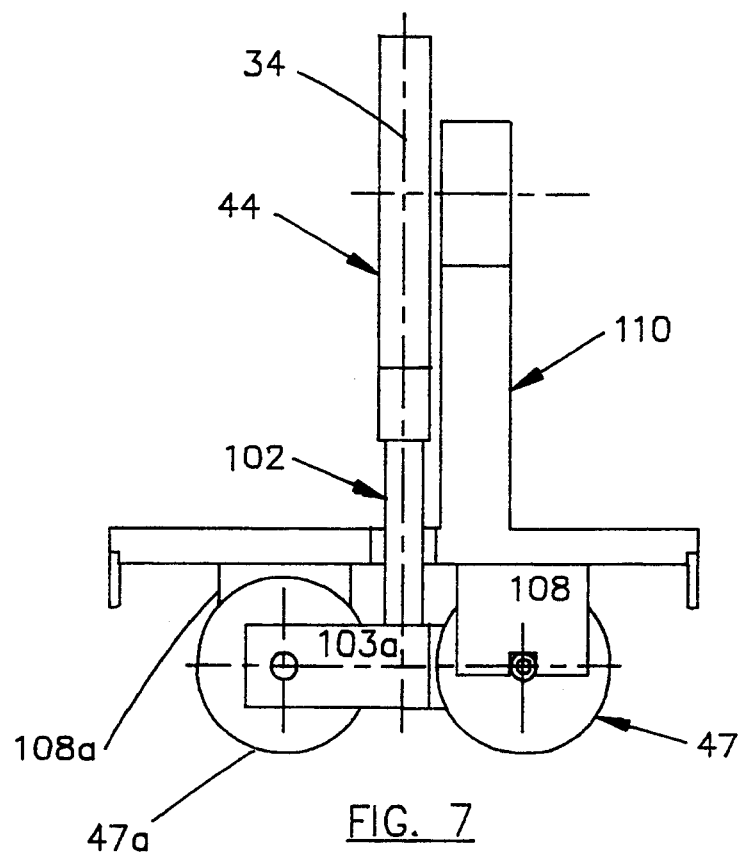
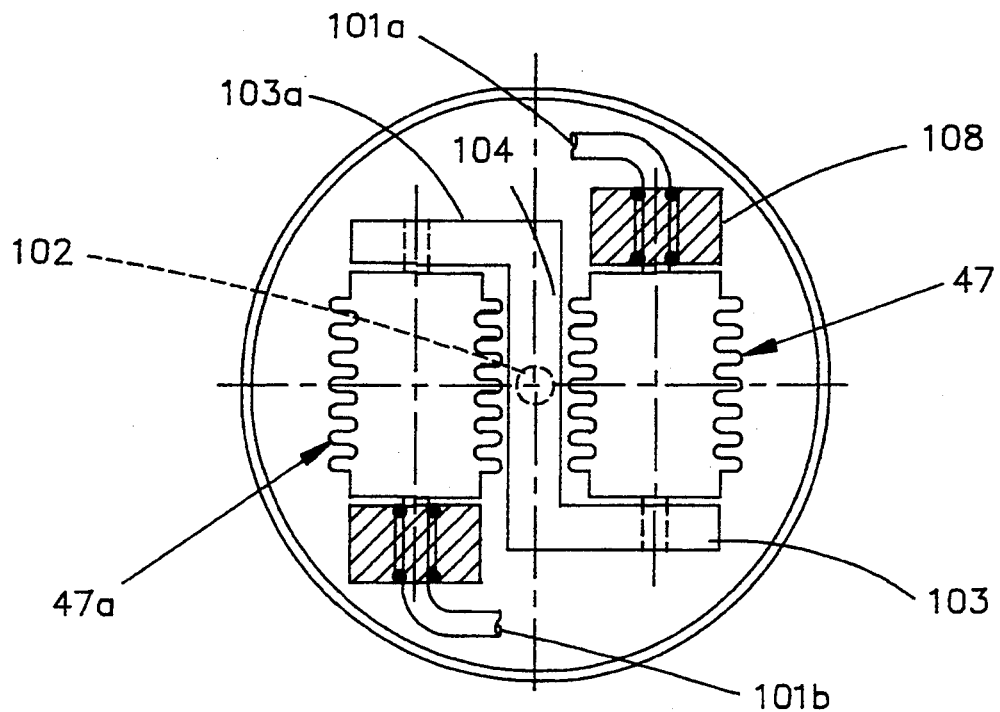

CAPACITANCE PRESSURE TRANSDUCER

RELATED APPLICATIONS

This application is related to Ser. No. 753,868 filed Sep. 3, 1991 and entitled, CAPACITOR AND PRESSURE TRANSDUCER, U.S. Pat. No. 5,230,250, and to Ser. No. 730,694 filed Jul. 16, 1991 and entitled "CAPACITOR AND PRESSURE TRANSDUCER", U.S. Pat. No. 5,168,419; and to Ser. No. 770,352, filed Oct. 3, 1991 and entitled "CAPACITOR AND PRESSURE TRANSDUCER", U.S. Pat. No. 5,207,767.

FIELD OF THE INVENTION

This invention relates to pressure transducers and more particularly to a pressure transducer using relatively small capacitors responsive to micro displacements for use in low pressure transducers under changing temperature conditions and for producing pressure measurements with a high degree of accuracy.

BACKGROUND OF THE INVENTION

The present invention has particular application in low pressure environments where accuracy of the measurements are important. In use of a pressure gauge, sudden pressure changes can also typically accompanied by a temperature change in a relatively short period of time. It is also important for the accuracy of the pressure sensor to not change its calibration (i.e. repeatability) over a period of time in response to pressure or temperature effects. Thus, there is a need for a pressure gauge for pressure measurements which is also insensitive to sudden changes in temperature or repeated effects of pressure over a period of time. The present invention relates to pressure transducers which can accurately measure pressure changes under transient temperature conditions independently of the temperature changes.

Under the combined effect of temperature and pressure conditions, the typical pressure sensor structure is subjected to stress by the applied pressure and subjected to temperature which together cause creep (permanent distortion) in the materials of the sensor structure. Creep in materials tends to be exponentially related to both temperature and stress levels. The effect of creep or permanent deformation in materials is to alter the calibration or measurement characteristics (repeatability) of a sensor and cause the sensor to obtain inaccurate measurements relative to its calibration standard over a period of time.

Heretofore, capacitance type transducers have been utilized for pressure measurements where pressure varies an electrical capacitance as a function of pressure. The pressure is translated to a capacitance measurement by a pressure diaphragm moving parallel arranged capacitance plates toward and away from one another. An example of the kind of device is shown in U.S. Pat. No. 4,322,775.

I have also coupled a bourdon tube to a capacitance type of sensor such as disclosed in U.S. Pat. No. 4,873,870 in which the pressure in the bourdon tube generates a directional linear force to displace quartz supported parallel arranged capacitor elements toward and away from one another. While this device is satisfactory for a number of applications, it is a difficult unit to manufacture.

Bourdon Tubes (as contrasted to a bellows) are also good for measurement of high pressures but at lower pressures of 500 psi or less the physical size of the bourdon tube required to obtain a response increases dramatically. Bellows, on the other hand are not suitable for high pressure measurements but are practical for sensing pressures to about 500 psi.

In the present invention, I have developed a capacitor device which has a unique relationship of capacitors that can be constructed from metals to respond to low force inputs and be relatively insensitive to temperature changes. The capacitor device is particularly adaptable to measurement of low pressure with a high degree of accuracy and repeatability over a period of time.

SUMMARY OF THE INVENTION

In the present invention, two capacitors are defined by spaced apart capacitor plates respectively located on spaced apart capacitor base members. The capacitor base members are vertically arranged in a housing. The capacitor plates for each capacitor are disposed at equally offset locations relative to a central vertical axis for the device so that a capacitor is located on either side of the vertical axis. One of the capacitor base members is arranged to be angularly torqued about a vertical torque axis by an applied torque force to dependently vary the respective capacitance of the capacitors. The angular torque is obtained by a bellows system which, when subjected to internal fluid pressure, produces a torque about the torque axis. The torque axis is centrally located in the angularly displaceable capacitor base member.

The bellows system is attached between a torque arm and to a reference base member to provide a torque force to capacitance torque beams in a capacitor base member. The bellows system when subjected to low pressures develops sufficient torque to provide the capacitance measurement and yet have stress levels well within its elastic limits of the bellow because only a low force is required to obtain a micro displacement of the torsion beams and the capacitor base member in micro measurements. Micro displacements of the capacitors are easily measured. Thus, creep and permanent distortion in the materials, which are caused by stress, are minimized in the system.

By arranging the capacitor base members so that related capacitance between capacitor plates are varied as a function of an angular relationship of the capacitor plates relative to a mid-plane, a high capacitance sensitivity can be obtained with low angular torque deflection. That is, a micro dimensional change in the capacitor gap produces a defined measurement parameter. The high sensitivity is obtained by measurement of a small displacement of the capacitor plates at a significant distance from the center of angular displacement (the displacement axis). The elastic characteristics of a metal torque beam means coupled to a force lever actuated by a bellows becomes the primary determining element relative to elastic properties.

The reason that the torsion beam means is a primary determining element is that the free deflection of the bellows is large compared to that allowed by the torsion beam means and therefor the bellows becomes essentially a pressure to force converter. By using a low driving torque force of a bellows and a lever arm a minute angular deflection of the torsion beam means, the stress levels in the bellows and particularly in the torque beam means can be kept well within micro-elastic limits. High performance metal alloys can then be used to provide correspondingly high micro yield values so that near perfect elastic characteristics are attainable in the operating range of the transducer.

Temperature is an important factor because it can affect the calibration of the sensor. While a pressure measuring device at an ambient temperature can be generally corrected by measured temperature, a change of temperature from an ambient value can thermally affect the response of the pressure measuring device to pressure which affects the accuracy of the pressure measurement. Changes in temperature often occur with changes in pressure so it is important to accurate pressure measurement for the pressure measuring device to be insensitive to changing or varying temperatures or to compensate for the changing temperatures.

In the present invention, aligned metal torque beams support a first capacitor base member in a vertical position. The base member has an attached torque coupling where the torque coupling extends vertically between a first capacitor base member and a bourdon tube. The first capacitor base member is arranged parallel to a fixed second capacitor base member. The torque beams have a rectangular cross section and are aligned with a vertical displacement axis which aligns the axis of the torque coupling. The non symmetrical cross section of the torque beams allows for large rigidity in the direction of the long cross sectional dimension without greatly increasing the torsional rigidity. The bellows is arranged with a lever arm to provide a torque force about the vertical torque axis. With the vertical support alignment, temperature does not significantly affect the capacitor relationship.

DESCRIPTION OF THE DRAWINGS

FIG. 5 is a plan view of the upper surface of the member to illustrate the slot system;

FIG. 6 is a plan view of one of the base members;

FIG. 7 is a view in longitudinal cross-section through a vertical central axis of another form of the present invention;

FIG. 8 is a view along line 7—7 of FIG. 7; and

DESCRIPTION OF THE PRESENT INVENTION

Figures 1, 2:
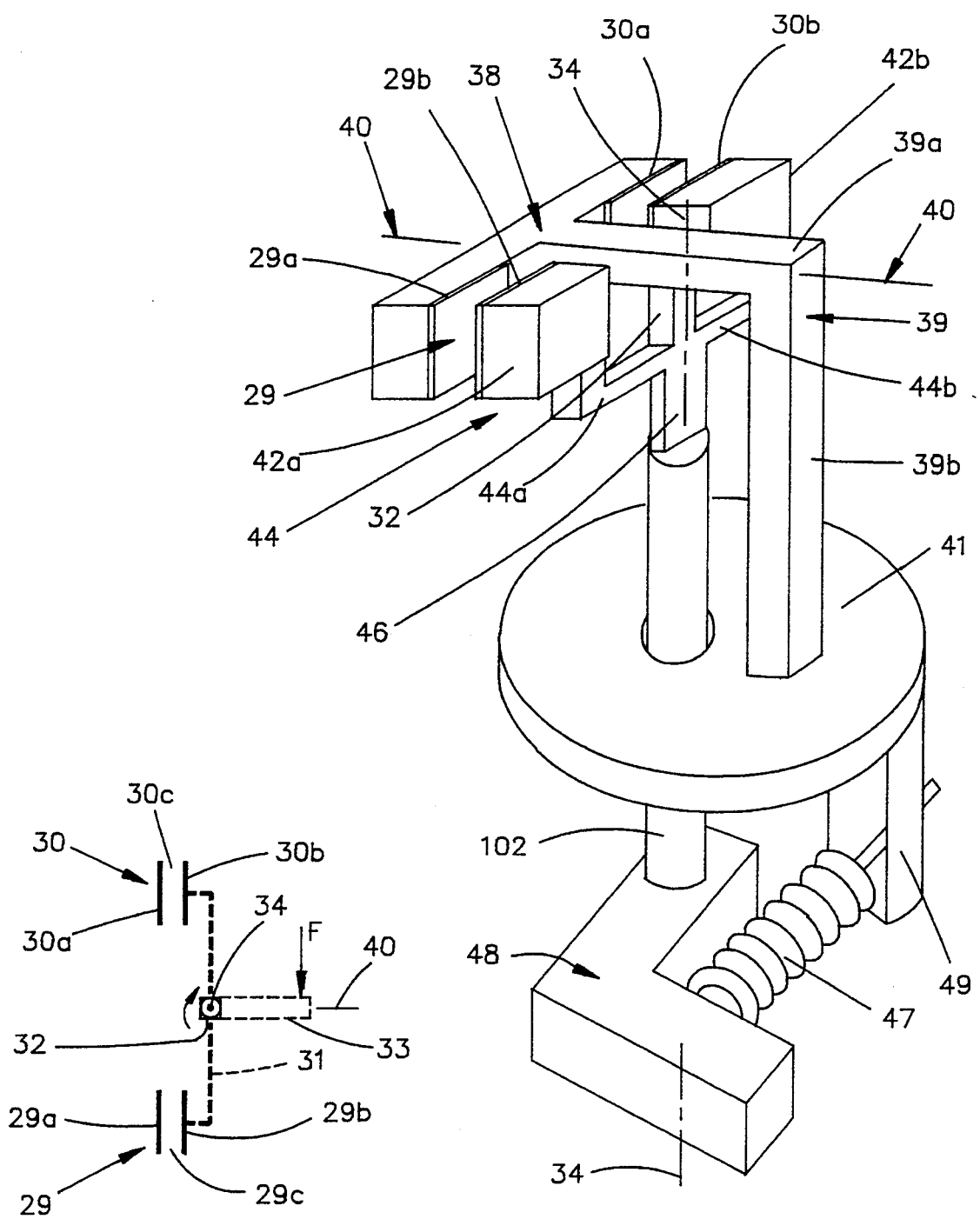
FIG. 1 is a schematic illustration of the concept embodied in the present invention.
FIG. 2 is a schematic view in perspective of a structural relationship for the invention.

Referring now to FIG. 1 and FIG. 2, the operating concept of the apparatus of the present invention is schematically (but disproportionally) illustrated for descriptive purposes. In FIG. 2, separate electrical capacitors 29,30 are illustrated where the capacitor 29 has parallel capacitor plates 29a, 29b which are separated by a capacitance gap 29c. The capacitor 30 has parallel capacitor plates 30a, 30b which are separated by a capacitance gap 30c. The plates 29a,30a are fixed and in a common plane transverse to the plane of the drawing and the plates 29b,30b are in a parallel common plane. The plates 29b, 30b are attached (see dashed line 31) to a torsion beam means 32. The beam means 32 has a torque axis 34 in a transverse plane and the beam means 32 can be torqued about its axis 34 to deflect the common plane for the plates 29b and 30b and dependently alter the capacitance of the capacitors 29,30. The torque is produced by a force "F" acting on a beam or lever member 33 which is attached to beam member 32.

As shown schematically in more detail in FIG. 2, the capacitor plates 29a,30a are on a fixed base member 38 and are located equidistant from a central horizontal axis 40. A vertical support means 39 with a horizontal extension 39a and a vertical extension 39b is fixed to a lower base member 41.

The capacitor plates 29b and 30b are located on elements 42a,42b of a base member 44. The elements 42a,42b are connected by horizontal extensions 44a,44b to a vertical torque coupling element 46 are connected by a vertical torsion beam element 32 to the support means 39. The torque coupling element 46 extends through an opening in the base member 41 and is connected to a torsion bar 48. A bellows 47 is located between one end of the torsion bar 48 and a vertical base member 49. A pressure tube 45 is connected to the bellows 47 and passes through the base member 49 and is attached thereto. The axis 34 of the torsion beam element 32 and the axis 40 define a plane perpendicular to the planes of the capacitor plates.

It can be appreciated that the structure is arranged so that an applied pressure in the bellows 47 causes a torque force about the axis 34 which is applied to the torsion beam element 32 so that the plates 29b and 30b are angularly displaced by torque about the vertical displacement axis 34 and dependently change the capacitor gaps 29c,30c. Thus, separate capacitors respectively utilizing the capacitance plates 29a,29b and 30a,30b will have dependently related capacitance changes in response to rotative displacement torque. As will be discussed herein, the torque displacement is in micro dimensions which reduces the stress in the torsion beam element.

From the foregoing basic illustration of a concept of the present invention, it can be appreciated that a bellows is utilized to develop a low torque force in response to low pressure which acts on a torsion beam member about a vertical displacement axis and produces a micro dimensional deflection of dependent capacitors. By utilizing low torque forces and microdisplacements, the stress levels in the beam member can be kept within the micro-elastic characteristics of the material for the beam member which permits high accuracy and repeatable measurements. The high accuracy measurements are obtainable because permanent distortion of the material does not appreciably occur and consequently does not affect the measurements. Material criterion for the torsion beam element is that the material should have a micro yield and micro creep point which is above the stress level produced by the maximum torque force.

Referring now to FIGS. 3, 4, 5 and 6, a more detailed illustration is provided for the capacitor arrangement of the present invention. In the illustration in the drawings, the structure of a capacitance transducer, as illustrated, includes an elongated, cylindrically shaped central fastener rod 50 with a central longitudinal axis 40 which is shown in a horizontal position. The axis 40 is normal to the planes of the capacitor plates. The rod 50 is a part of the support means and couples a first vertical capacitor plate base member 38 to a fixed center section 65 (see FIGS. 3 and 5) in a second vertical capacitor plate base member 44. The first base member 38 is cylindrically shaped and is made of a material having inherently dimensionally stable characteristics under changing environmental conditions such as temperature and time aging. Quartz is a suitable material.

As shown in FIG. 5, the second capacitor base member 44 is a cylindrically shaped metal plate member which has a first slot configuration of slot systems 62, 63 which are defined by spaced apart wall surfaces and which are tortuously located in the body of the second base member 44. The first slot configuration provides the fixed central plate section 65 which is connected by spaced apart torsion beam members or sections 66a, 66b to outer plate sections 67a, 67b (see FIG. 5). The beam members 66a, 66b are rectangular shaped in cross section with a narrow dimension in the plane of the drawing (FIG. 5) and a long dimension in a transverse plane. The beam members 66a, 66b are adapted to be torqued about a central vertical torque or displacement axis 34 where the torque or displacement axis 34 is located centrally of the beam members 66a, 66b and on a vertical median plane extending through the second base member 44. The displacement axis 34 also intersects and defines a vertical plane with the axis 40. The displacement axis 34 is parallel to the parallel planes in which the capacitor plates are located.

The central section 65 thus is a generally rectangularly shaped member defined between the slots systems 62 and 63 which are symmetrically arranged with respect to a central displacement axis 34. The outer section of the second base member 44 is attached by the torsion beam members 66a, 66b to the central section 65 along the central axis 34. Also along the central axis is a torque coupling element 44a (see FIG. 5).

As shown in FIG. 5, the slot system 62 has a central vertically walled portion 62a connected to parallel arranged walled end portions 62b and 62c by transversely arranged wall slot portions 62d and 62e. The slot 63 has similarly arranged portions 63a, 63b, 63c, 63d and 63e relative to the slot system 62. The spacing between the end portions 62b, 63b and 62c, 63c of the slots 62 and 63 define the narrow width dimension of the beam members 66a and 66b. The length of the slot portions 62b, 63b and 62c, 63c also defines the length of the beam members 66a and 66b.

Figure 3:
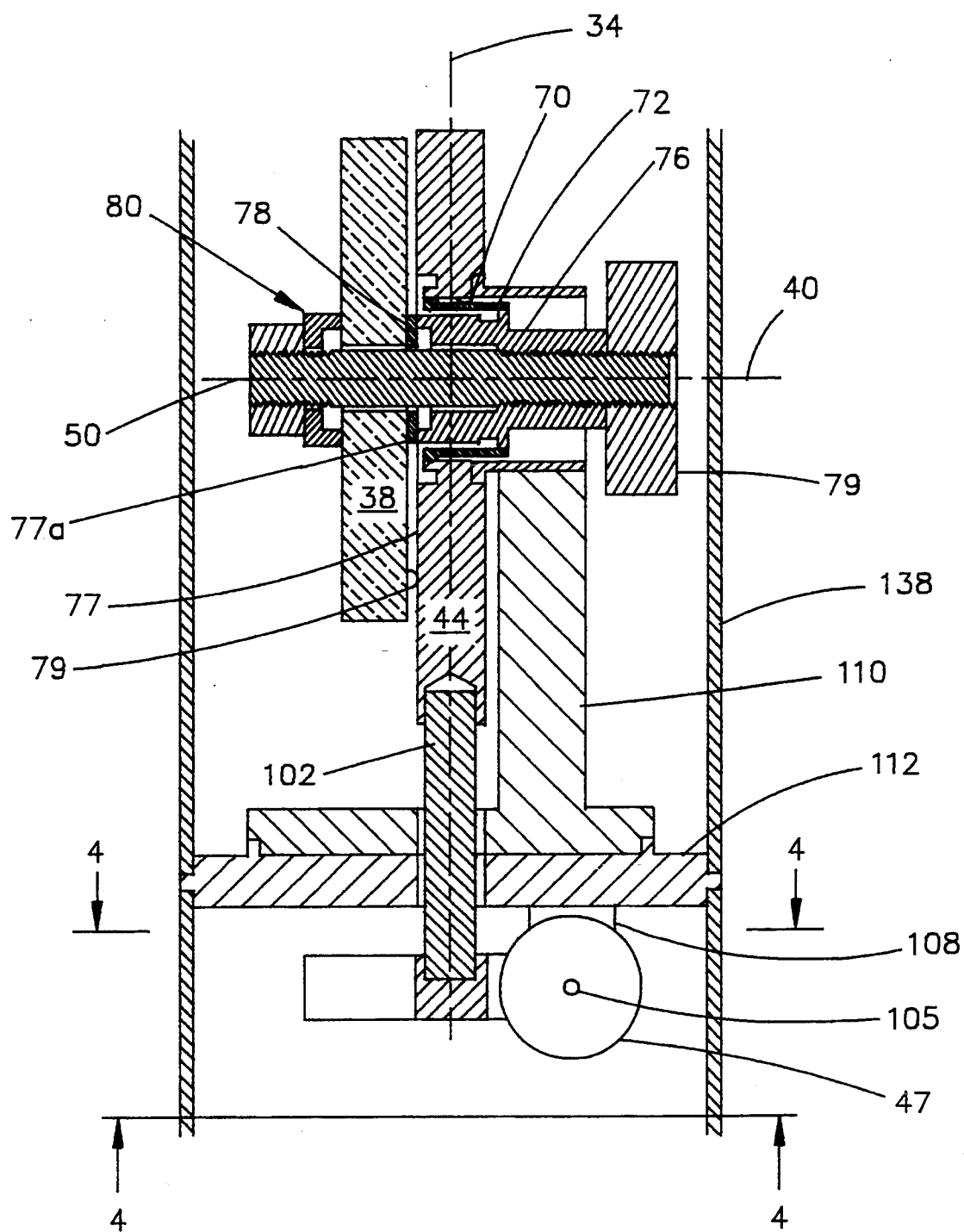
FIG. 3 is a view in longitudinal cross section through a vertical central axis of one form of the present invention.

Referring to FIG. 3, in the center of the central section 65 and the base member 44 is a mounting bore 70 which is centered on the axis 40. The bore 70 receives an annular outer tubular support ring 72. The outer support ring 72 is welded about its periphery at its end surface to the central section 65. Disposed within the outer support ring 72 (see FIG. 5) is an annular inner tubular support member 76.

The inwardly facing planar surface 77 of the outer plate section of the second base member 44 is on the same vertical plane as the upper surface 77a of the center section 65. The facing surface 79 of the first base member 38 is parallel to the surface 77 of the second base member 44. Between the inner support member 76 on the second base member 44 and the first base member 38 is a disc shaped spacer member 78. The spacer member 78 effectively defines the capacitance gap for capacitor plates on the surfaces 79 and 77.

The rod 50 is threadedly attached to the support member 76 and extends through a centrally located opening on the first base member. A clamping means 80 threadedly attaches to the rod 50 so that the first and second base members 38 and 44 are assembled in a unitary assembly. A portion of the rod 50 extends outwardly of the support member 76 and is threadedly attached and welded to a balance mass 79. The balance mass 79 overcomes gravity effects when the device is in a horizontal position. The spacer member 78, the rod 50, the clamping means 80, and the support member 76 can be made from a material which is selected to have similar temperature expansion characteristics to the selected material for the base member 38. A metal material such as Invar is suitable. The base member 44 is made from a high strength material, such as a maraging stainless steel with good elastic characteristics for the torsion beam members. The steel base member 44 also will provide an electrical ground for the capacitor electrical system. By way of illustration, the coefficient of expansion for various materials averages (at room temperature) as follows:

| | |
|---|---|
| Super Invar | 0.2 parts/million/oF |
| Maraging | 6 parts/million/oF |
| Quartz | 0.3 parts/million/oF |

The first capacitor base member 38, as noted before, is made from a cylindrically shaped member preferably constructed from a quartz material and has first and second independent capacitance plate films 79a and 79b (See FIG. 6) which are sputtered in separate locations onto a surface 79 of the base member 38. The capacitance plate film 79a is arranged in spacial alignment with the planar surface 77 on the second capacitance base member 44. Connection is made to the edge of the quartz plate. Electrical wire conductors are then connected to each capacitor film plate for separate capacitor measurements. On the surface 77, facing capacitance plate films 77a, 77b on an insulator base (See FIG. 5) are provided, if desired, or the metal can be used as a ground surface in a grounded electrical capacitance system.

As shown in FIG. 3, the planar surface 79 on the first base member 38 is arranged normally parallel to the planar surface 77 on the second capacitor base member 44 and is normally separated therefrom by a capacitor spacing distance or gap. The capacitance plate films 79a and 79b which are offset from the central horizontal axis 40 (see FIG. 6) and from the vertical plane through the displacement axis 34 are similarly spaced parallel to the planar surface 77 on the base member 44. The widths of the capacitor gaps between the respective plate films 79a, 79b and the surface 77 is basically defined by the width of the spacer member 78. It can thus be appreciated that the clamping means 80 on the fastener rod 50 attach the first capacitor base member 38 to the inner support ring 76 and, in turn, to the central section 65 of the second capacitor base member 44.

Referring again to FIGS. 3 and 5, the second capacitor base member 44 is also provided with a second vertical wall slot system comprised of angular "L" shaped slots 90 and 91 which are symmetrically arranged with respect to the axis 34. The sidewalls of the slot portion 90a of the sidewalls of slot 90 align with the sidewalls of the slot portion 62a of the slot 62. The sidewalls of the slot portion 91a of the slot 91 align in vertical planes with the sidewalls of the slot portion 63a of the slot 63. The sidewalls of the slot portions 90b and 91b of the slots 90,91 are aligned in horizontal planes with one another and are perpendicularly arranged relative to the displacement axis 34. It can be seen that the slot portions 90b and the slot portions 91b, respectively, define transverse beam portions 95,96 about an axis perpendicular to the displacement axis 34. The purpose of this arrangement is to minimize temperature effects by providing an equal and accurately controlled heat conduction path to each capacitance side.

Figure 4:
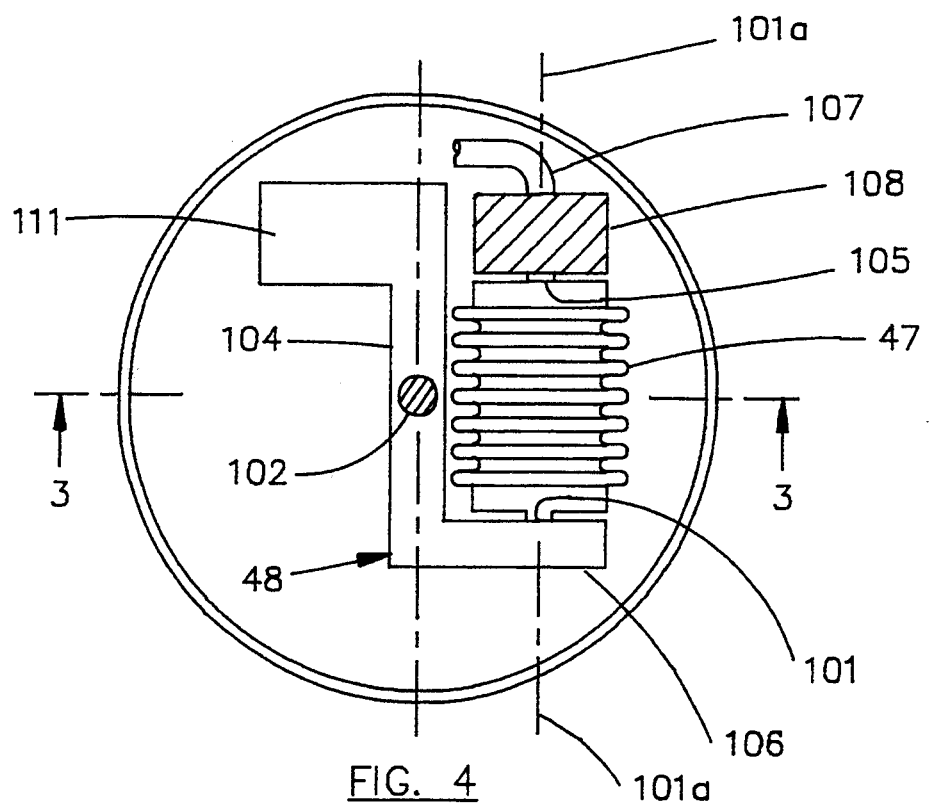
FIG. 4 is a view along line 4—4 of FIG. 3.

The torquing of the beam members 66a,66b on the central section 65 of the base member 44 is accomplished by a bellows member 47 (FIGS. 3 & 4). The bellows member 47 has a closed stub end 101 (FIG. 4) which is aligned with an axis 101a perpendicular to the displacement axis 34 and is attached to an offset end beam 103 on the torque coupling element 48. The beam element 103 is rigid and at right angles to the central portion 104 of the torque coupling element 48. The central portion 104 is elongated and rigid with a lengthwise dimension parallel to the axis 101a. The open end 105 of the bellows member 47 is aligned with the axis 101a and is coupled to an inlet pipe 107. The inlet pressure pipe 107 extends through an opening in a vertical base member 108 and is attached thereto. The base member 108 is a depending part of a transverse support member 112. At the opposite end of the central portion 104 is a counterbalance member 111 which is at right angles to the central portion 104. The counterbalance member 111 balances the gravity effects of the bellows 47.

The assembly of the base members 38 and 44 is supported on a vertical support member 110. The support member 110 is attached to the cylindrically shaped base member 112. In practice, a metal cylindrical enclosure housing 138 encloses the capacitance and bellows at a vacuum or contains inert gas.

One of the features of the present invention is the arrangement which enables use of micro-elastic characteristics of metals. By way of definition, the macro yield point of a metal can be defined as the point where the metal has a set or plastic strain (permanent deformation) of 0.2% or two parts per thousand. The micro yield point of a metal is defined as the point where the metal has a set in a range of 0.01% to 0.0001% or one part per ten thousand to one part per million. In utilizing microelastic characteristics, a low or small force produces a small deflection. As an example, a 0.3 inch pound torque is used to produce a capacitance deflection of 0.001 radians. By constraining the bellows 47 between the base member 108 and the member 105 pressure of 500 psi or less produces a low stress and low movement in the bellows which is coupled to a capacitance transducer. The capacitor transducer utilizes a relatively small deflection so that the primary determining element is the torque beams which have very low stress levels. The bellows then operates in an essentially constrained mode as a pressure to force converter. Additionally since the stress levels in the torsion beam members are in the micro-elastic range, the elastic characteristics of the torsion beams can approach nearly ideal performance. Ideal performance is approached by the diminishing effect of hysteresis creep, and no-linear response as stress levels are reduced.

The stress levels in obtaining micro-elastic characteristics are low because the deflection required for the capacitor sensor can be small, for example 0.001 radians. The beam members providing the displacement axis are stiff or rigid and the torque force applied is low, for example 0.3 inch pounds.

By way of example, the diameter of the base member 38 is about 0.850 inches. The diameter of the base member 44 is about 0.900 inches and 0.125 inches thick. The width of the slots is about 0.020 inches. The spacer 78 is 0.001 inches thick.

While the preferred embodiment is to exploit micro yield characteristics to produce accuracy and repeatability, macro yield materials may be suitable for some applications.

The effect of temperature on the torque output of a bellows is minimized because the differences in linear expansions produce a very small corresponding change in torque and the capacitance plate structure which significantly rejects any displacement other than torque.

Temperature can also affect the capacitance structure. The top base member of the capacitor is preferably a low expansion material which is dimensional stable, such as quartz. The lower capacitance member is preferably made of the same material as the torque beam to avoid welds.

The two capacitance plates are respectively mounted by aligned connections to a base member which, in turn, is attached to another mass. Since the structure is mounted in a vacuum, temperature change of the capacitance plates is affected primarily by thermal conduction through the mountings.

The electronics used for this sensor can be as described in U.S. Pat. No. 4,091,693. A ratio metric measurement is made using the relationship $(C_1 - C_2)/(C_1 + C_2)$ so that the oscillator factor cancels out in the reading. One of the important features of the present invention is that the capacitor can operate with minute deflection changes and produce measurable signals.

Referring now to FIG. 7 and FIG. 8, it will be appreciated that when two bellows 47a and 47a are used in a mirror configuration, the torque arm member 104 is attached to the torque rod 102 and has symmetrically arranged torque arms 103, 103a at right angles to the central portion 104. The second bellows has a pressure inlet 101b which can be the same source as the inlet 101a. This system is entirely balanced for gravity and for forces about the torque axis. The bellows are fixed to the bore portions 108 and 108a.

Figure 9:
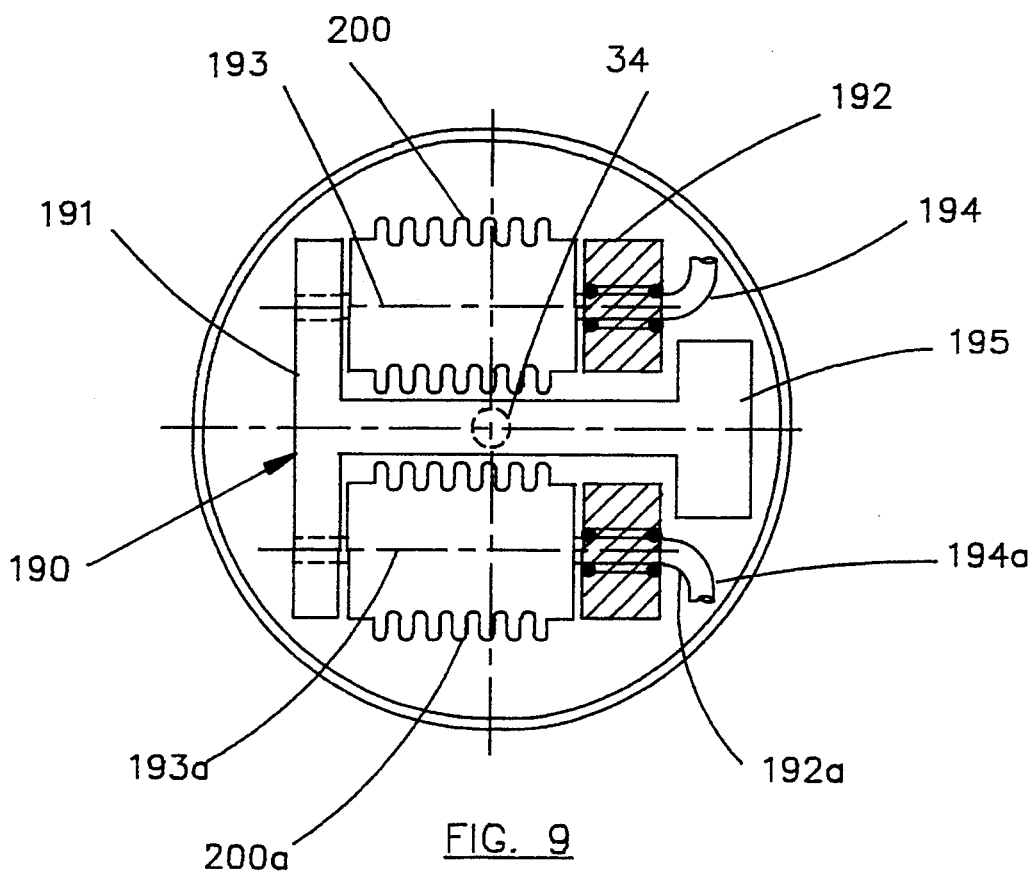
FIG. 9 is a view of another form of the present invention.

A still further form of the insertion is shown in FIG. 9 where a "T" shaped lever member 190 is located transverse to the torque axis 34. The cross bar portion 191 of the lever member 190 is connected to Bellows 200 and 200a where the bellows are respectively attached to depending base members 192,193a. The bellows 200 and 200a are respectively aligned along parallel axes 193, 193a and are supplied pressure via inlets 194, 194a. A balance member 195 is also provided. With this arrangement the deferential pressure between the different pressure sources can be measured by the resultant torque force on the capacitor base member.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A dual capacitor device for utilizing dependent capacitances for measurement purposes comprising:
   a first capacitor base member and a second capacitance base member arranged with parallel capacitor surfaces in parallel planes where facing parallel capacitor surfaces are located on opposite sides relative to a transverse central plane and where said facing capacitance surfaces respectively define first and second capacitors;

said second capacitor base member having a centrally located section connected to an outer section of said second capacitor base member by torsion beam means, said centrally located section being attached to said first capacitor base member by attachment means;

said torsion beam means having a displacement axis parallel to said capacitor surfaces so that angular displacement of said outer section of said second capacitor base member relative to said centrally located section about said displacement axis produces a capacitance change in said first and second capacitors;

force means coupled to said outer section of said second capacitor base member for producing a torsion force on said torsion beam means for developing angular displacement of said outer section and a capacitance change as a function of said torsion force, said force means including a torque member aligned with said displacement axis and having a transverse portion providing a moment arm and including a pressure bellows acting on said moment arm for providing said torsion force.

2. The capacitor device as set forth in claim 1 wherein the torsion beam means has a rectangular cross section with long and short dimensions relative to said displacement axis, and where the surfaces of said torsion beam beams are parallel to said displacement axis and wherein said long dimension is normal to the planes of said capacitor surfaces.

3. The capacitor device as set forth in claim 2 wherein said second capacitor base member has a first parallel walled slot means which define a central portion coupled to said attachment means and which define said torsion beam means where said torsion beam means connect to said outer section of said second capacitor base member.

4. The capacitor device as set forth in claim 3 wherein said second capacitor base member has a second parallel walled slot means which define transverse torsion beam means where said transverse torsion beam means are in said outer base portion of said second capacitor base member and are located in a plane transverse to said central plane.

5. The capacitor device as set forth in claim 1 wherein the torsion beam means are constructed from a high strength metal material having good elastic characteristics and wherein said force means is a bourdon tube arranged in a coil about a coil axis for developing a torsion force which does not exceed the micro yield point of the torsion beam means and wherein said coil axis is aligned with said displacement axis.

6. The capacitor device as set forth in claim 1 wherein the torsion beam means are constructed from a high strength metal material having good elastic characteristics with a macro yield point above the working stress levels in said torsion beam means.

7. The capacitor device as set forth in claim 1 wherein the torsion beam means are constructed from a material having good elastic characteristics with a micro yield point above the working stress levels of the torsion beam means.

8. The capacitor device as set forth in claim 1 wherein the torsion beam means are constructed from a high strength metal material having good elastic characteristics in the stress range of the torsion mean means.

9. The capacitor device as set forth in claim 1 wherein said torque member has transverse portions disposed symmetrically with respect to said displacement axis and a pressure bellows acting on each of said transverse portions for providing said torsion force.

10. The capacitor device as set forth in claim 9 wherein said pressure bellows acting on each of said transverse portions for providing a torsion force are arranged to provide said torsion force in a similar angular direction.

11. The capacitor device as set forth in claim 9 wherein said pressure bellows acting on each of said transverse portions for providing said torsion force are arranged to provide said torsion force in opposite angular directions for deriving a differential pressure measurement.

12. A dual capacitor device for utilizing dependent capacitances for measurement purposes comprising:

a first capacitor base member and a second capacitance base member arranged with parallel capacitor surfaces in parallel planes where facing parallel capacitor surfaces are located on opposite sides relative to a transverse central plane and where said facing capacitance surfaces respectively define first and second capacitors;

said second capacitor base member having a displacement axis disposed in said central plane and disposed parallel to said parallel planes;

torsion beam means disposed along said displacement axis and attached to said second capacitor base member so that angular displacement of said second capacitor base member about said displacement axis produces a capacitance change in said first and second capacitors; and force means coupled to said torsion means for producing a torsion force on said torsion beam means for developing angular displacement of said second capacitor base member and a capacitance change in said capacitors as a function of said torsion force;

said force means including a torque member aligned with said displacement axis and having a transverse portion providing a moment arm and including a bellows acting on said moment arm for providing said torsion force.

13. The capacitor device as set forth in claim 12 wherein the torsion beam means has a rectangular cross section with long and short dimensions relative to said displacement axis, and where the surfaces of said torsion beam beams are parallel to said displacement axis and wherein said long dimension is normal to the planes of said capacitor surfaces.

14. The capacitor device as set forth in claim 12 wherein said second capacitor base member has a first parallel walled slot means which define, a central section, an outer section and said torsion beam means where said torsion beam means connect said outer section to said central section; and attachment means for attaching said center section to said first capacitor base member.

15. The capacitor devise as set forth in claim 14 wherein said second capacitor base member has a second parallel walled slot means which define transverse torsion beam means where said transverse torsion beam means are in said outer base portion of said second capacitor base member and are located in a plane transverse to said central plane.

16. The capacitor device as set forth in claim 15 wherein the torsion beam means are constructed from a high strength metal material having good elastic characteristics and wherein said bourdon tube is constructed and arranged for developing a torsion force which does not exceed the micro yield point of the torsion beam.

17. The capacitor device as set forth in claim 12 wherein the torsion beam means are constructed from a high strength metal material having good elastic characteristics with a macro yield point above the working stress levels in said torsion beam means.

18. The capacitor device as set forth in claim 12 wherein the torsion beam means are constructed from a material having good elastic characteristics with a micro yield point above the working stress levels of the torsion beam means.

19. The capacitor device as set forth in claim 12 wherein the torsion beam means are constructed from a high strength metal material having good elastic characteristics in the stress range of the torsion beam means.

20. The capacitor device as set forth in claim 12 wherein said torque member has transverse portions disposed symmetrically disposed with respect to said displacement axis and a pressure bellows acting on each of said transverse portions for providing said torsion force.

21. The capacitor device as set forth in claim 12 wherein said pressure bellows acting on each of said transverse portions for providing said torsion force are arranged to provide said torsion force in similar angular directions.

22. The capacitor device as set forth in claim 12 wherein said pressure bellows acting on each of said transverse portions for providing said torsion force are arranged to provide said torsion force in opposite angular directions for deriving a differential pressure measurement.

23. A method of measuring capacitance in a dual capacitor device utilizing dependent capacitances for measurement purposes and wherein the capacitor device has a first capacitor base member and a second capacitance base member arranged with parallel capacitor surfaces in parallel planes where said parallel capacitor surfaces are located on opposite sides relative to a central transverse plane and said capacitance surfaces define first and second capacitors having first and second capacitance gaps, the method comprising the steps of:

obtaining a torque force by subjecting a bellows to a fluid pressure where the bellows is fixed between a support member and a moment arm for a torque member attached to a torsion beam means on said second capacitance base member where the torque member defines a displacement axis;

torquing the torsion beam means coupled to said second capacitor base member with the torque force about the displacement axis for angularly deflecting said second base member about said displacement axis so that angular displacement of said second base member about said displacement axis produces a dependent change in said capacitance gaps of said first and second capacitors.

24. A method of measuring capacitance in a dual capacitor device as set forth in claim 23 wherein the torque force is maintained below the macro yield point of the torsion beam means.

25. A method of measuring capacitance in a dual capacitor device as set forth in claim 23 wherein the torque force is maintained below the micro yield point of the torsion beam means.

26. A method as measuring capacitance in a dual capacitor device as set forth in claim 23 and where the step of applying a torque force about the displacement axis includes applying the torque force in opposite angular directions with bellows connected to separate sources of pressure so that the torquing of the torsion beam means is a result of differential pressure.

27. A method of measuring capacitance in a dual capacitor device utilizing dependent capacitances for measurement purposes and wherein the capacitor device has a first capacitor base member and a second capacitance base member arranged with parallel capacitor surfaces in parallel planes where said parallel capacitor surfaces are located on opposite sides relative to a central transverse plane and said capacitance surfaces define first and second capacitors having first and second capacitance gaps and wherein the second capacitance base member has a central section attached to said first capacitor base member and an outer section connected by torsion beam means to said central section, and wherein said torsion beam means is disposed along a displacement axis in said central plane with the torsion beam means being coupled to a torque member aligned with said displacement axis and having a transverse moment arm acted upon by a bellows, and wherein said capacitor surfaces on said second capacitance base member are located on said outer section, comprising the steps of:

torquing said outer section of said second capacitor base member about said displacement axis located in said torsion beam means by applying a fluid pressure to said bellows for developing a torque force about said displacement axis and developing an angular displacement of said outer section of second base member about said displacement axis in response to pressure for producing a dependent change in said capacitance gaps of said first and second capacitors; and maintaining the torque force below the yield point of the torsion beam means to minimize permanent distortion in said torsion beam means.

28. A method of measuring capacitance in a dual capacitor device as set forth in claim 27 wherein the torque force is maintained below the macro yield point of the torsion beam means.

29. A method of measuring capacitance in a dual capacitor device as set forth in claim 27 wherein the torque force is maintained below the micro yield point of the torsion beam means.

* * * * *